United States Patent [19]
Uchida et al.

[11] Patent Number: 6,160,662
[45] Date of Patent: Dec. 12, 2000

[54] INVERTED MICROSCOPE HAVING A VARIABLE STAGE POSITION

[75] Inventors: Tadashi Uchida; Tatsuro Otaki, both of Tokyo, Japan

[73] Assignee: Nikon Corporation, Tokyo, Japan

[21] Appl. No.: 09/321,602

[22] Filed: May 28, 1999

[30] Foreign Application Priority Data

May 29, 1998 [JP] Japan .................................. 10-166385

[51] Int. Cl.$^7$ ........................... G02B 21/06; G02B 21/26
[52] U.S. Cl. ......................... 359/390; 359/368; 359/385; 359/391
[58] Field of Search ................................... 359/363, 368, 359/370, 380–395

[56] References Cited

U.S. PATENT DOCUMENTS

| | | | |
|---|---|---|---|
| 4,210,384 | 7/1980 | Meyer et al. ........................... | 359/385 |
| 4,756,611 | 7/1988 | Yonekubo et al. ..................... | 359/370 |
| 5,175,644 | 12/1992 | Dosaka ................................... | 359/385 |
| 5,270,855 | 12/1993 | Hasegawa .............................. | 359/383 |
| 5,535,052 | 7/1996 | Jorgen ................................... | 359/385 |
| 5,870,222 | 2/1999 | Yamamoto et al. ................... | 359/398 |

FOREIGN PATENT DOCUMENTS 224123  6/1985  Germany ............................... 359/390

OTHER PUBLICATIONS

Zeiss, Axiomat, "Microscope System for Routine and Research Work in Medicine", 1978.

*Primary Examiner*—Thong Nguyen

[57] ABSTRACT

An inverted microscope having a variable stage position, a compact size, excellent operability, and low cost. The inverted microscope includes a detachable stage unit to support a stage on which a specimen is positioned and to support an objective lens facing the specimen. A microscope housing supports the stage, and includes an imaging lens positioned to image a parallel light beam from the objective lens. An observation unit is positioned on the microscope housing to observe the image formed by the imaging lens. An illumination unit, positioned between the microscope housing and the stage unit, irradiates light having a predetermined wavelength toward the specimen, and includes a fluorescent light unit. The illumination unit is detachably mounted to the microscope housing, and the stage unit is detachably mounted to the illumination unit, and a height of the stage with respect to the microscope housing is variable. The height of the stage can be changed when the illumination unit between the microscope housing and the stage unit is removed.

8 Claims, 5 Drawing Sheets

INVERTED MICROSCOPE HAVING A VARIABLE STAGE POSITION

CROSS-REFERENCE TO RELATED APPLICATIONS

This application is based upon and claims priority of Japanese Patent Application No. 10-166385 filed May 29, 1998, the contents being incorporated herein by reference.

BACKGROUND OF THE INVENTION

1. Field of the Invention

The present invention relates to inverted microscopes, and, more particularly, the present invention relates to an inverted microscope including a light emission unit which can be removably mounted in the inverted microscope and including a stage which can be removably mounted and variably positioned according to whether or not the light emission unit is installed.

2. Description of the Related Art

Inverted microscopes are known. For example, FIG. 5 is a side view of a conventional inverted microscope. As shown in FIG. 5, the conventional inverted microscope includes a microscope housing 110 which supports a stage 121 at both ends thereof; an illuminating column 130, which constitutes a transmission illumination system, positioned on one end of the microscope housing 110; a revolving nosepiece 171 located below the stage 121 on which objective lenses 170 are mounted; an up-and-down movement unit 180 and an up-and-down movement handle 181 to move the revolving nosepiece 171 up and down; and an observation unit 140 to observe an image formed by the objective lens 170.

The conventional inverted microscope shown in FIG. 5 also includes a fluorescent light device 160 which is necessary when performing fluorescent light observations with the inverted microscope. The fluorescent light device 160 includes a fluorescent light cassette 163 having a dichroic mirror 165 to reflect light having short wavelengths and to transmit light having long wavelengths.

In order to demonstrate the expected performance of the dichroic mirror 165, it is desirable for illuminating light condensed by the objective lens 170, and reflected from a specimen 150 positioned on the stage 121, to pass through the fluorescent light cassette 163. For this purpose, the fluorescent light device 160 is inserted into a hollow in a lower side of the up-and-down movement unit 180 which moves the revolving nosepiece 171 up and down to a desired location.

However, the space to mount the fluorescent device 160 is wasted space if a visual observation by a user of the inverted microscope takes place without performing fluorescent light observation, or without performing phase difference observations. Further, the position of the stage 121 is higher by the amount of the space required to mount the fluorescent light device 160, causing the position of the illuminating column 130 to become high. As a result, a problem occurs in that the inverted microscope becomes bulky.

Moreover, when the position of the stage 121 is high, the operability becomes poor when changing the specimen 150, or when operating a manipulator of a micro-scale (not shown) in the upper surface of the stage 121 or illuminating column 130.

In contrast to the inverted microscope shown in FIG. 5, another type of inverted microscope is known which solves the above-noted problems of the microscope shown in FIG. 5 by providing an inverted microscope having a microscope housing 110 which does not have the space required to insert the fluorescent light device 160 (i.e., a microscope housing from which the observer cannot take out the fluorescent light device). However, two types of inverted microscopes would then be required, and the manufacturing cost is increased.

Moreover, because the observer cannot remove the fluorescent light device 160 after purchasing the inverted microscope, it is very difficult to expand the system when the necessity arises to install the fluorescent light device 160. Therefore, another inverted microscope has to be purchased in which the fluorescent light device can be installed, and the user ends up incurring extra cost.

SUMMARY OF THE INVENTION

It is an object of the present invention to overcome the above-described problems of prior art inverted microscopes, and to provide an inverted microscope including a light emission unit which is removably mounted in the inverted microscope and a stage unit which is removably mounted and having a variable stage position.

It is another object of the present invention to provide an inverted microscope having a smaller size, which is superior in operation, and has a lower cost than conventional inverted microscopes.

Objects and advantages of the present invention are achieved in accordance with embodiments of the present invention with an inverted microscope comprising a stage unit to support a stage on which a specimen is positioned, and to support an objective lens facing the specimen; a microscope housing including an imaging lens positioned to image a parallel light beam from the objective lens; an observation unit, positioned on the microscope housing, to observe the image formed by the imaging lens; an illumination unit, positioned between the microscope housing and the stage unit, to irradiate light having a predetermined wavelength on the specimen; and a detection unit to detect the light from the specimen, wherein the illumination unit is detachably mounted to the microscope housing and the stage unit is detachably mounted to the illumination unit, and a height of the stage with respect to the microscope housing is variable.

In accordance with embodiments of the present invention, when at least one of the illumination unit to irradiate light having a predetermined wavelength on the specimen and the detection unit to detect light from the specimen is mounted between the microscope housing and the stage unit, the stage position becomes high. When the mounted illumination unit or detection unit is removed, the position of the stage is lowered, and the height of the microscope becomes lower. Further, in accordance with the present invention, the position of observation unit disposed on the microscope housing does not change, and one microscope can perform various observations.

In accordance with embodiments of the present invention, the illumination unit may comprise a fluorescent light unit having a fluorescent light device to irradiate exciting light toward the specimen via the objective lens, and to pass fluorescent light from the specimen to the imaging lens via the objective lens.

By mounting only the fluorescent light unit between the microscope housing and the stage unit it is possible to observe fluorescent light images.

In accordance with embodiments of the present invention, the stage unit may comprise a revolving nosepiece to support the objective lens, and a revolving nosepiece up-and-down movement device to movably support the revolving nosepiece in the optical axis direction of the objective lens.

Therefore, in accordance with embodiments of the present invention, because the stage unit includes the revolving nosepiece to support the objective lens, and the revolving nosepiece up-and-down movement device to support the revolving nosepiece movably in the optical axis direction of the objective lens, the method of microscopic observation can be easily changed by mounting other units in the downward direction of the stage unit, or by detaching other units from below the stage unit.

In accordance with embodiments of the present invention, the observation unit may comprise an eyepiece lens, wherein the eyepiece lens is located upward of the stage. Because the eyepiece lens is located upward from the stage, when an observer's eye is removed from the eyepiece lens, it can normally see the upper surface of the stage.

In accordance with embodiments of the present invention, a height from a bottom surface of the microscope housing to the stage is preferably less than 190 mm when the illuminating unit or detection unit are not mounted.

In accordance with embodiments of the present invention, when a user is performing microscopic observations, a comfortable posture for the user is considered to be a posture in which the angle from the elbow to the wrist with respect to a table top is less than about 50°. If the length from a person's elbow to wrist is taken as 250 mm, when the distance from the eye point to the center of the stage is considered, a distance from the bottom of the housing (table top) to the stage top of 190 mm is desirable. By making the distance from the bottom of the housing to the stage top 190 mm or less, with an operator's elbow placed on the table top, operation of the microscope can be comfortably performed for a long time, and operability of the inverted microscope is increased.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
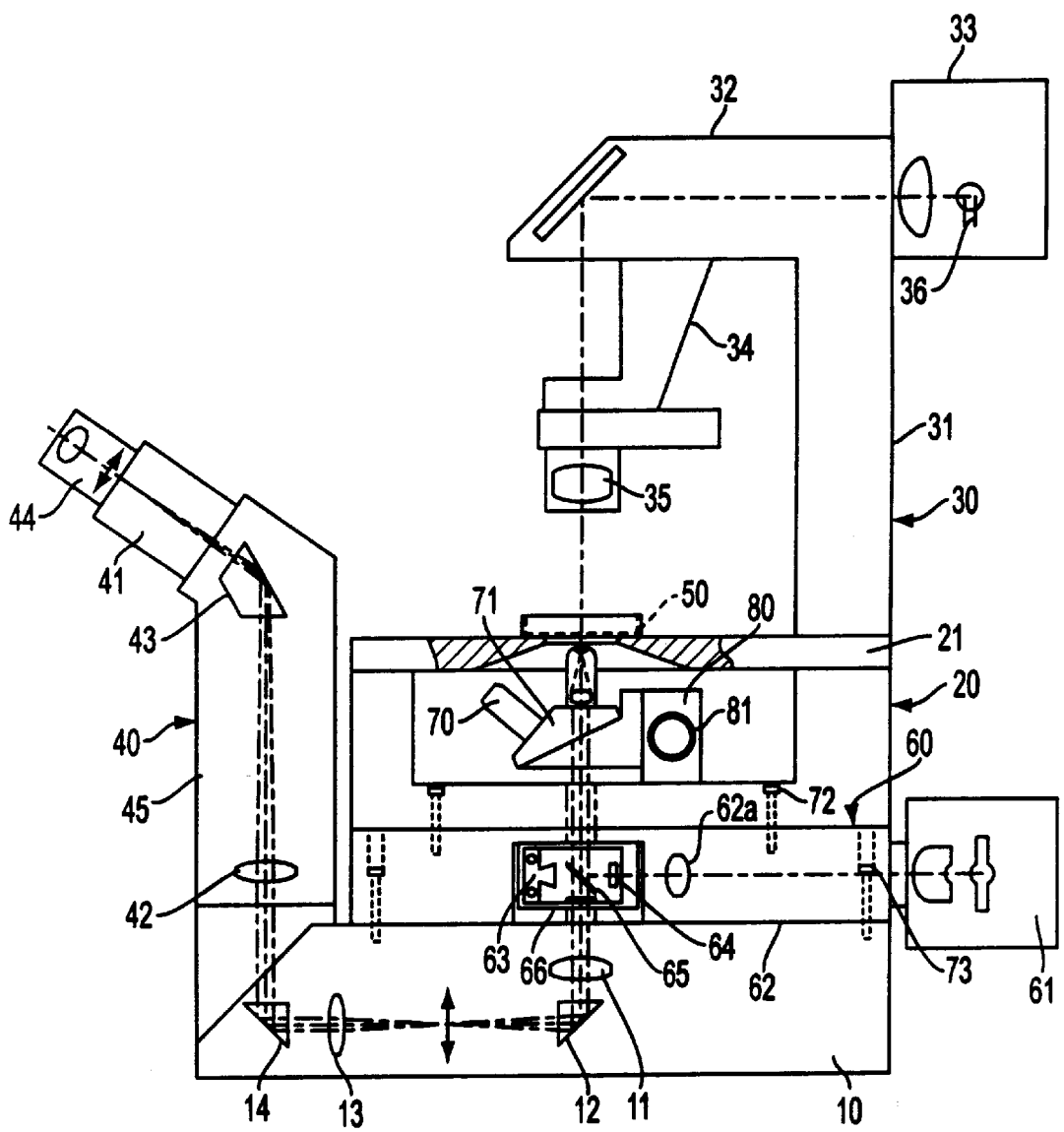
FIG. 1 is a side view of an inverted microscope including a fluorescent light device in accordance embodiments of the present invention.

Reference will now be made in detail to the preferred embodiments of the present invention, examples of which are illustrated in the accompanying drawings, wherein like reference numerals refer to like elements throughout.

FIG. 1 is a side view of an inverted microscope in accordance with embodiments of the present invention. FIG. 1 illustrates the inverted microscope in a state with a fluorescent light emission unit 60 inserted in the inverted microscope. As shown in FIG. 1, the inverted microscope includes a microscope housing 10, a stage unit 20, an illumination column 30, an observation unit 40, and a fluorescent light emission unit 60.

The microscope housing 10 includes an imaging lens 11, mirror 12, relay lens 13 and mirror 14 located in succession in the microscope housing 10.

The observation unit 40 is disposed at one end of the microscope housing 10 and includes a body tube 45, a binocular unit 41 at one end of the body tube 45, and an eyepiece lens 44 located in the binocular unit 41. An imaging lens 42 and a prism 43 are disposed in the body tube 45.

The stage unit 20 includes a stage 21 on which a specimen 50 is positioned, a revolving nosepiece 71 to support objective lenses 70, and an up-and-down movement device 80 to support the revolving nosepiece 71 for up and down movement. The eyepiece lens 44 is located upward from the stage 21. Further, a sliding stage (not shown in the drawing) can be provided on the stage 21 of the stage unit 20 to move the specimen 50 in optional directions.

The revolving nosepiece 71 can move up and down in the optical axis direction of the objective lens 70 by operation of an up-and-down movement handle 81 disposed in the revolving nosepiece up-and-down movement device 80. Accordingly, the specimen 50 can be brought into focus by changing the height of the objective lens 70 by operation of the up-and-down movement handle 81. Furthermore, the up-and-down movement device 80 may be positioned on a side surface or a lower surface of the stage 21, and not on the bottom surface of the stage unit 20.

The objective lenses 70 include plural objective lenses of different kinds which are mounted in the revolving nosepiece 71. The revolving nosepiece 71, for example, is fixed to the side surface of the revolving nosepiece up-and-down movement device 80 by, for example, a dovetail unit (not shown in the drawing). Furthermore, because the objective lenses 70 are preferably infinity corrected optical type objective lenses (referred to hereinbelow as "infinity type objective lenses") the light which passes through the objective lenses 70 becomes a parallel light beam.

The illumination column 30 is disposed on the stage unit 20, and comprises a vertical unit 31 and a horizontal unit 32 extending in a horizontal direction from the top end of the vertical unit 31. A lamp housing 33 accommodates a halogen lamp 36, or like light source, and is located at a rear surface side of an upper end of the illumination column 30. A condenser lens 35 is mounted to the horizontal unit 32 by a mounting unit 34. The illumination column 30, lamp housing 33 and condenser lens 35 make up a transmission illumination system used to illuminate specimens.

The fluorescent light emission unit 60 includes a fluorescent light device having a lamp housing 61, an illuminating light projection device 62, and a fluorescent light cassette 63. The lamp housing 61 preferably includes a xenon lamp, mercury lamp, or the like, accommodated in the lamp housing 61, which can irradiate light having wavelengths from visible to ultraviolet. The illuminating light projection device 62 also includes a condensing lens 62a and a field stop (not shown in the drawing).

A filter block comprising an excitation filter 64, a dichroic mirror 65, and an absorption filter 66 is built into the fluorescent light cassette 63. The dichroic mirror 65 obtains the necessary characteristics by a multilayer coating of a dielectric; however, the reflection or transmission characteristics of the dichroic mirror 65 change according to the angle of incidence of light on the multilayer coating. In accordance with embodiments of the present invention, the dichroic mirror 65 is set to obtain the anticipated characteristics with respect to light having an angle of incidence of 45°. Accordingly, the dichroic mirror 65 is positioned at an angle of inclination of 45° with respect to the optical axis.

As shown in FIG. 1, the fluorescent light emission unit 60 is fixed to an upper portion of the microscope housing 10 by plural screws 73. Moreover, the stage unit 20 is fixed to an upper portion of the fluorescent light unit 60 by plural screws 72.

During fluorescent light observation (see FIG. 1), light from the lamp housing 61 passes through the illuminating light projection device 62, the fluorescent light cassette 63 and the objective lens 70, and is incident on the specimen 50. Fluorescent light from the specimen 50 passes through the objective lens 70 and the fluorescent light cassette 63, and passes to the imaging lens 11.

After light from the specimen 50 is imaged by the imaging lens 11, the image passes to the body tube 45 via the mirror 12, relay lens 13 and mirror 14. The light passes to the binocular unit 41 via the imaging lens 42 and the prism 43 of the body tube 45, and is imaged by the binocular unit 41. The image of the specimen 50 is then enlarged by the eyepiece lens 44 and is observed by the eye.

Furthermore, as shown in FIG. 1, the binocular unit 41 is mounted in the body tube 45 of the inverted microscope. However, the present invention is not limited to a single binocular unit 41 mounted in the body tube 45. For example, photographic photography or video photography may be performed by mounting three eyepiece tubes including a straight tube having an imaging lens.

Figure 2:
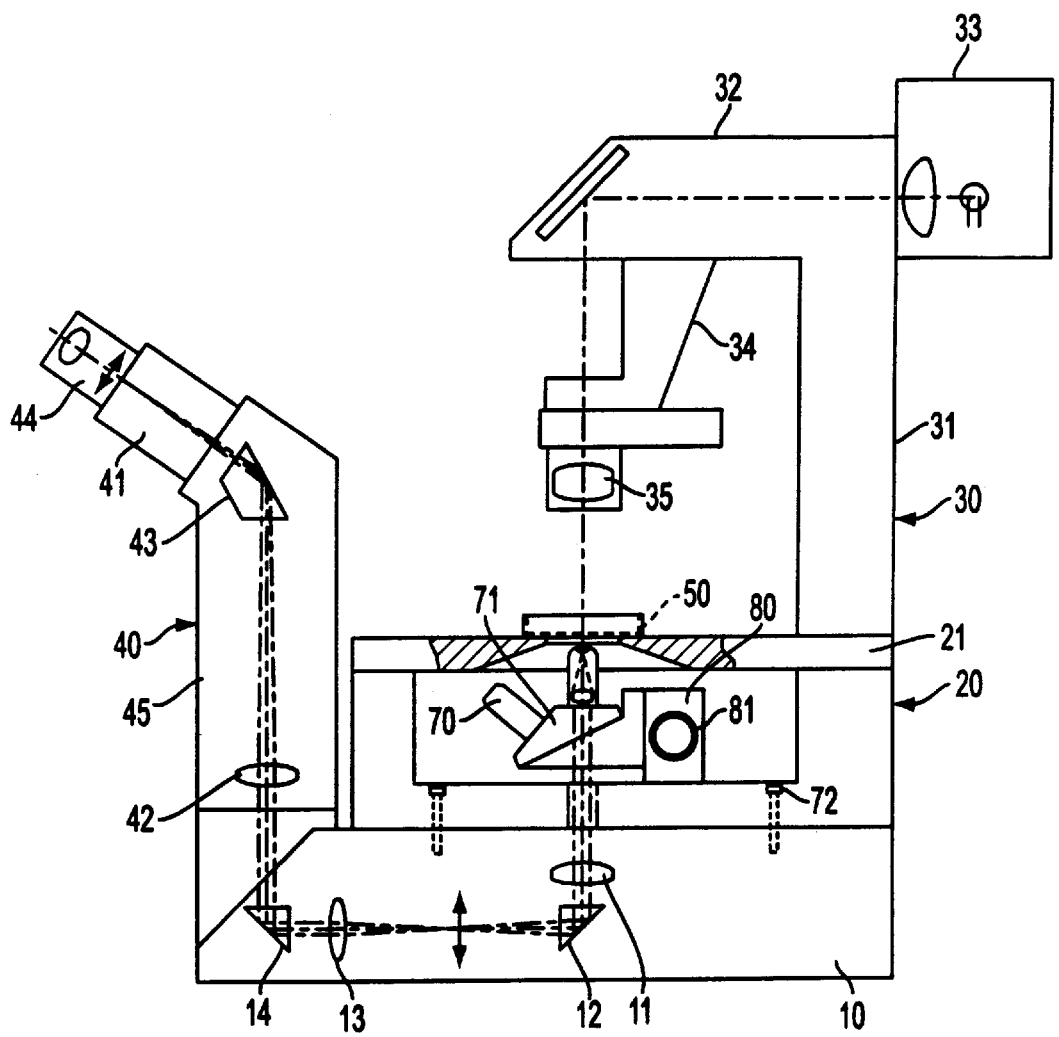
FIG. 2 is a side view of an inverted microscope in which the fluorescent light device is not included in accordance with embodiments of the present invention.

FIG. 2 is a side view of the inverted microscope in accordance with embodiments of the present invention. More particularly, FIG. 2 illustrates the inverted microscope in a state in which a fluorescent light emission device is removed from the inverted microscope. Like elements shown in FIGS. 1 and 2 are referred to by like reference numerals.

As shown in FIG. 2, when, for example, bright field observation or phase contrast observation is performed, the stage unit 20 can be detached from the fluorescent light emission unit 60 by removing the screws 72, and the fluorescent light emission unit 60 can be detached from the microscope housing 10 and removed from the microscope by removing the screws 73.

After removing the fluorescent light emission unit 60, during bright field observation the stage unit 20 may be lowered (i.e., moved downward) and the stage unit 20 may be fixed by the screws 72 to the upper portion of the microscope housing 10, as shown in FIG. 2. During phase contrast observation, the objective lens 70 is replaced by a special use lens, and a stop is inserted in the condensing lens 35. Further, during phase contrast observation, the microscope housing 10, revolving nosepiece 71 and stage unit 20 are the same as those shown in FIG. 1, and there are no changes to the optical system, such as lens supplements or the like.

In accordance with the embodiment of the invention shown in FIG. 2, when an observer performs only bright field observations or phase contrast observations and does not perform fluorescence observations, by lowering the position of the stage 21 and, furthermore, by lowering the position of the illumination column 30, the inverted microscope is made more compact. Moreover, because the position of the eyepiece lens 44 does not change, the height of an observer's eye level does not change.

Thus, in accordance with embodiments of the present invention, because of the removably mounted fluorescent light emission unit 60 and variable position stage unit 20, the operations of changing specimens 50, or the like, on the stage 21 can be performed comfortably, and operability is increased. More particularly, operation is efficient because it is not necessary for an operator to raise the hands when operating the manipulator of a micro-scale mounted on the illumination column 30 or mounted on the upper surface of the stage 21. Furthermore, in accordance with embodiments of the invention, as shown in FIG. 2, the distance (height) from the bottom surface of the microscope housing 10 to the upper surface of the stage 21 is preferably 190 mm or less, and it is desirable to set the height at a distance which increases the comfort of the operation.

Furthermore, in accordance with embodiments of the present invention, when the fluorescent light emission unit 60 is mounted, the interval between the objective lens 70 and the imaging lens 11 becomes long, and when the fluorescent light unit 60 is removed the interval between the objective lens 70 and the imaging lens 11 becomes short. Nevertheless, because the light emitted from the objective lens 70 is a parallel beam, there are no effects on the optical image resulting from the difference in interval between the objective lens 70 and image lens 11.

Moreover, a user of the inverted microscope in accordance with the present invention need only purchase the necessary units, and when the user wishes to expand the system, the additional units can be purchased. Accordingly, the inverted microscope in accordance with embodiments of the present invention is economical compared with the prior art inverted microscope. Further, in accordance with the present invention, because it is not necessary for the manufacturer to provide two different kinds of microscope housings, the manufacturing cost can be reduced.

Figure 3:
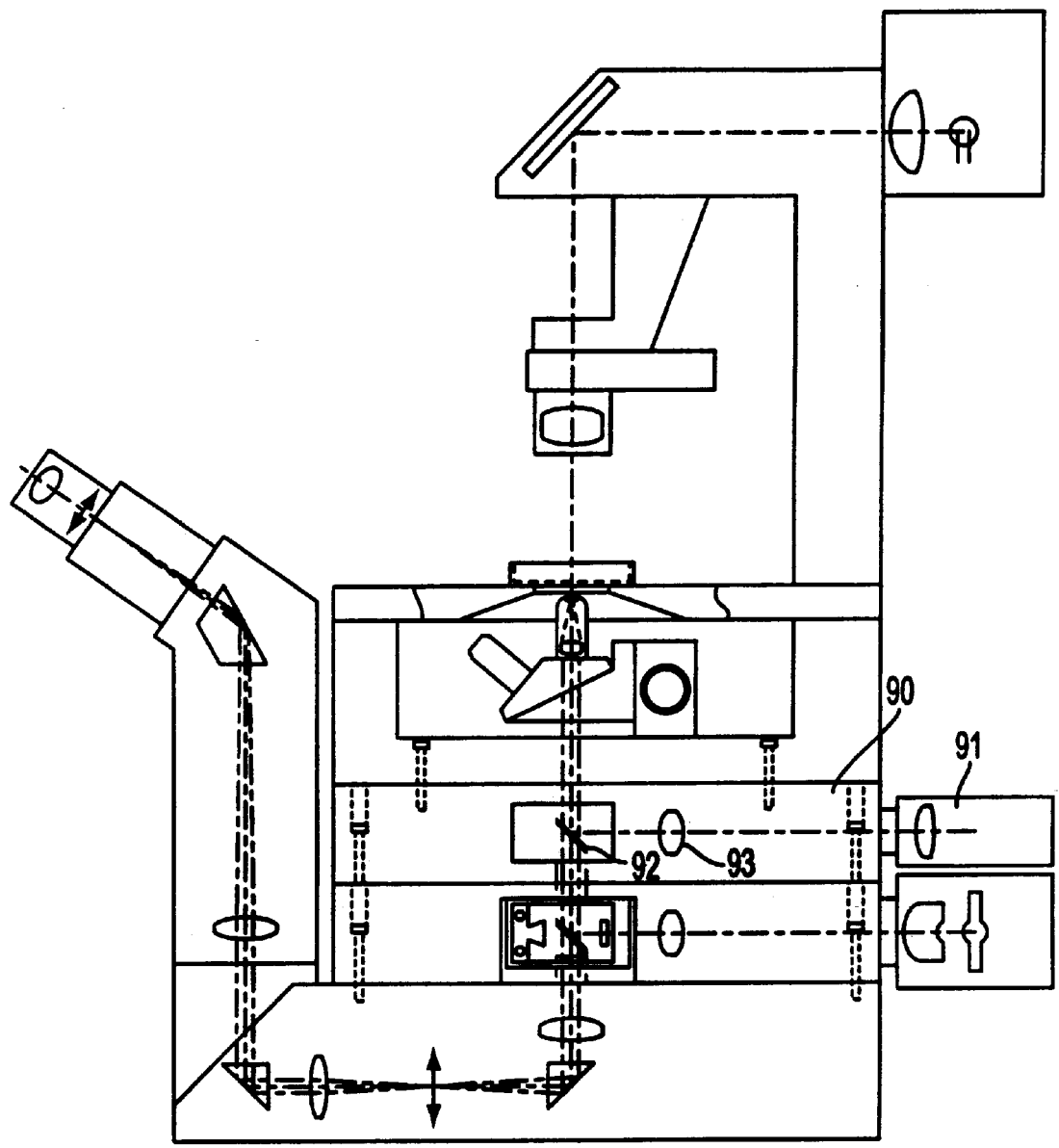
FIG. 3 is a side view of an inverted microscope in accordance with an embodiment of the present invention.

Furthermore, in accordance with embodiments of the present invention described hereinabove, a single fluorescent light emission unit 60 is mounted between the microscope housing 10 and the stage unit 20. However, the present invention is not limited to a single fluorescent light emission unit 60, and the present invention may include a plurality of units positioned in layers. As shown in FIG. 3, the inverted microscope may include other illuminating units, independent of a fluorescent light emission unit, mounted on the fluorescent light emission unit. For example, the additional independent units may include a unitary laser manipulation device 90 comprising a laser 91, dichroic mirror 92 and condensing lens 93; a confocal unit or the like; a detection unit, for example, an autofocus unit, a photographic unit or the like. The plural units positioned in layers may be used simultaneously.

Figure 4:
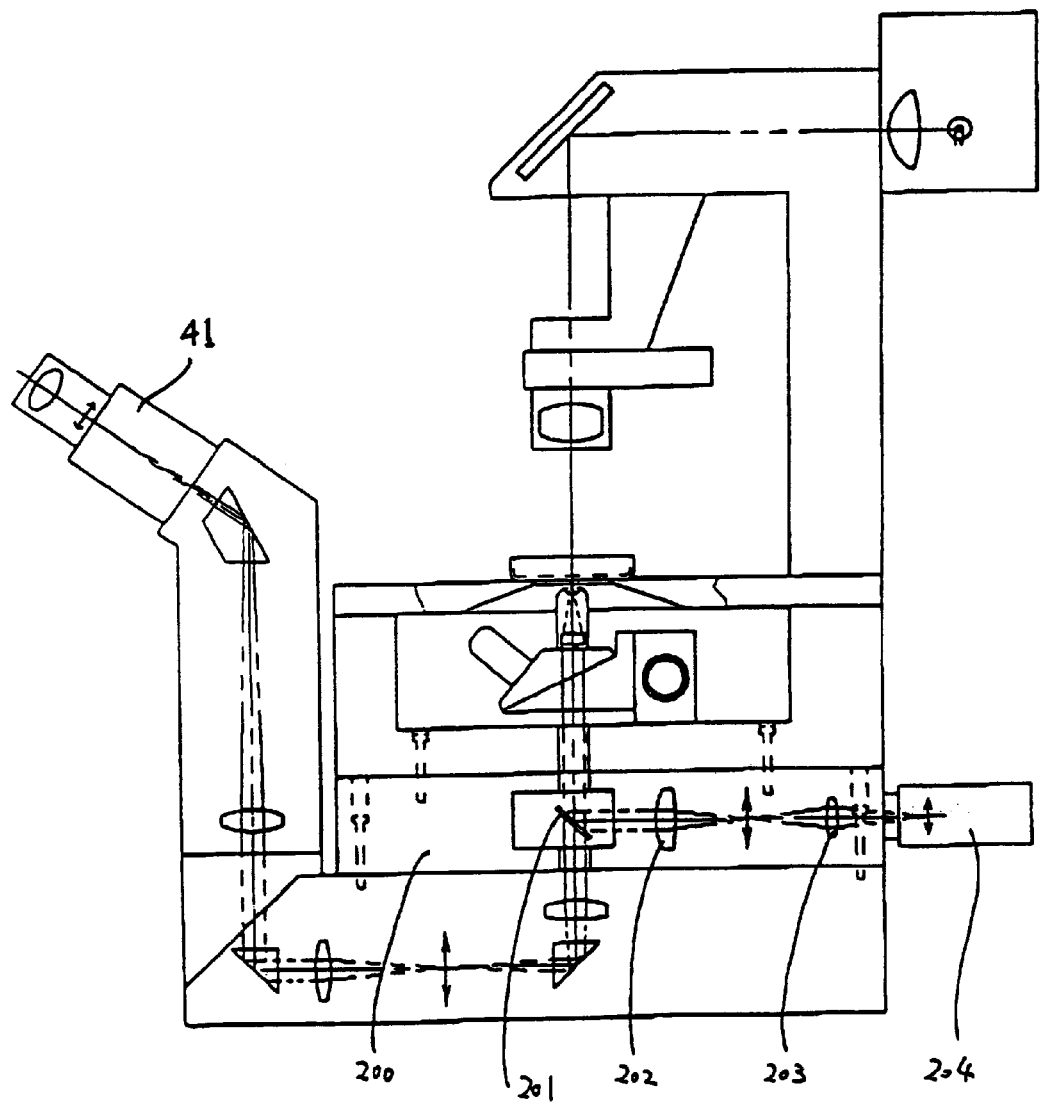
FIG. 4 is a side view of an inverted microscope in accordance with embodiments of the present invention.
Figure 5:
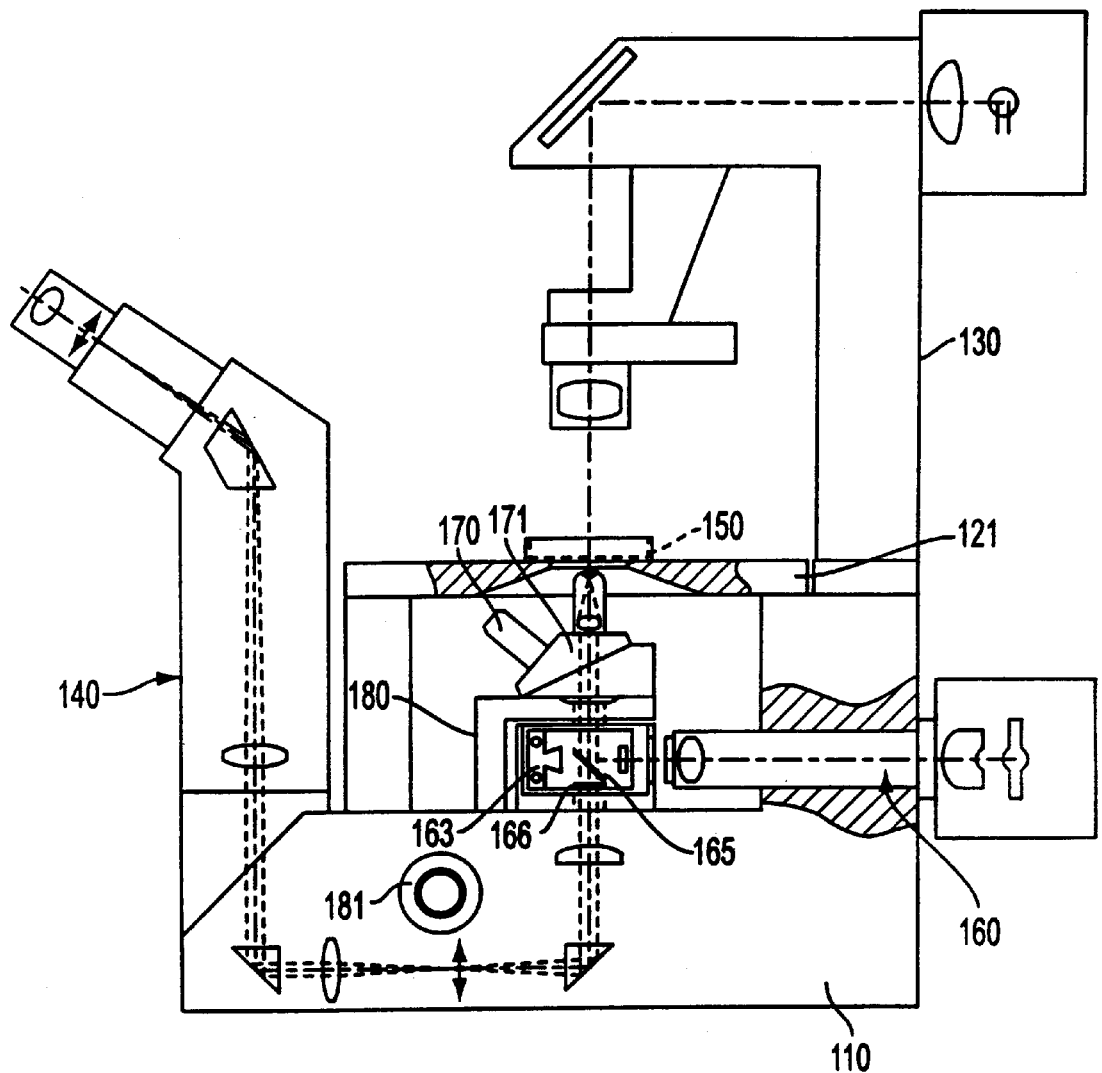
FIG. 5 is a side view of a prior art inverted microscope.

FIG. 4 is a side view of an inverted microscope including a detection unit in accordance with embodiments of the present invention. As shown in FIG. 4, the detection unit 200 is a photographic unit. In operation of the inverted microscope shown in FIG. 4, a light from the specimen, after having been imaged by an imaging lens 202 via a semi-transparent mirror 201, passes through a relay lens 203 to a light receiving portion of a CCD camera 204. By mounting the photographic unit 200 in the inverted microscope, video photography can be performed with the CCD camera 204 while observing with the naked eye using the binocular unit 41.

Moreover, in accordance with the embodiment shown in FIG. 4, a CCD camera may be mounted in place of the binocular unit 41 and the semi-transparent mirror 201 may be replaced by a dichroic mirror to divide the light to the detection side CCD camera 204 and the binocular unit side CCD camera according to wavelength. Thus, in accordance with this modification of the embodiment shown in FIG. 4, a light of specific wavelengths can be photographed.

Moreover, in accordance with embodiments of the present invention, the illumination column 30 is located in the stage unit 20. However, the present invention is not limited to the illumination column 30 being located in the stage unit 20. For example, the illumination column 30 may be disposed in the microscope housing 10. When the illumination column 30 is located in the microscope housing 10, and a fluorescent light emission unit 60 is mounted in the inverted microscope, it is desirable for the transmission illumination optical system, from the illumination column 30 or the lamp housing 33 to the condensing lens 35, to be able to move in the direction of the optical axis of the objective lens 70.

Furthermore, in accordance with the embodiments of the invention described hereinabove, infinity type objective lenses are used. However, the present invention is not limited to infinity type objective lens, and light beams from objective lenses which include finite type lenses and concave lenses may be used to form parallel light beams.

In accordance with embodiments of the present invention described hereinabove, by providing an inverted microscope including at least one of an illuminating unit to illuminate a specimen with light having a predetermined wavelength and a detection unit to detect light from the specimen removably mountable between the microscope housing and the stage unit, the stage position becomes high when at least one of the illuminating unit and the detection unit is mounted. However, the stage position is lowered when the mounted illumination unit or detection unit is removed, and an overall height of the microscope is therefore lowered, thus increasing compactness and operability of the inverted microscope.

Furthermore, because the inverted microscope in accordance with embodiments of the present invention enables a user to perform various observations with one microscope stand, the inverted microscope is economical. Moreover, because the position of the observation unit or units 40 disposed in the microscope housing does not change when the stage unit 20 is lowered, the observer's eye level does not change. Because the level of the observer's eye does not change, a comfortable operating posture can normally be maintained.

The inverted microscope in accordance with embodiments of the present invention advantageously makes fluorescent light observation possible by simply mounting a removable fluorescent light unit between the microscope housing and the variable level stage unit.

The inverted microscope in accordance with embodiments of the present invention advantageously allows the microscopy method to be easily changed by mounting another unit downward of the stage unit, or detaching another unit from downward of the stage unit.

The inverted microscope in accordance with embodiments of the present invention advantageously allows the upper surface of the stage to be seen when the eye is moved away from the eyepiece lens.

The inverted microscope in accordance with embodiments of the present invention advantageously enables operation of the microscope to be performed in the state with the elbow placed on a table surface. Accordingly, operations can be comfortably performed for a long time, and operability is increased.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An inverted microscope, comprising:
    a stage unit including a stage on which a specimen is positioned, an objective lens positioned under the stage, and a first mounting surface;
    a microscope housing including an imaging lens positioned to form an image of an optical image of the specimen passed from the objective lens, and a second mounting surface on an upper surface of the microscope housing to which the first mounting surface can be detachably mounted;
    an observation unit directly installed in the microscope housing, forming a transmission observation optical system to observe the optical image of the specimen formed by the imaging lens; and
    a functional unit detachably arranged between the first mounting surface and the second mounting surface, the functional unit performing one of irradiating the specimen via the objective lens or a detecting function.

2. An inverted microscope as recited in claim 1, wherein the functional unit is an illumination unit comprising a fluorescent light unit having a fluorescent light device to irradiate light to the specimen via the objective lens, and to pass fluorescent light from the specimen to the imaging lens via the objective lens.

3. An inverted microscope as recited in claim 1, wherein the stage unit comprises a revolving nosepiece to support the objective lens, and a revolving nosepiece up-and-down movement device to movably support the revolving nosepiece in an optical axis direction of the objective lens.

4. An inverted microscope as recited in claim 1, wherein the observation unit comprises an eyepiece lens, and the eyepiece lens is located upward of the stage.

5. An inverted microscope as recited in claim 1, wherein a height from a bottom surface of the microscope housing to the stage is less than 190 mm when at least one of the illuminating unit and detection unit is not mounted.

6. An inverted microscope as recited in claim 1, further comprising:
    a transmission illumination unit including a vertical unit in an upper portion of the stage unit, a horizontal unit extending horizontally from an upper end surface of the vertical unit, and an illumination unit disposed in the horizontal unit to irradiate the specimen on the stage.

7. An inverted microscope as recited in claim 1, wherein the microscope housing includes an installation unit at one end portion in a region other than the second mounting surface which directly installs the observation unit, wherein the observation unit includes a body tube and a binocular unit at an end portion of the body tube, the binocular unit being positioned vertically upward from the stage.

8. An inverted microscope, comprising:
    a stage unit having a stage on which a specimen is positioned, a first mounting surface, and supporting an objective lens positioned under the stage;
    a microscope housing including an imaging lens to form an image of the optical image of the specimen passed through the objective lens, and a second mounting surface on an upper surface of the microscope housing to which a mounting surface can be detachably mounted;
    an observation unit directly installed in an end of the microscope housing, and forming an observation optical system to observe an optical image of the specimen formed by the imaging lens; and
    a plurality of freely detachable functional units between the first mounting surface and the second mounting surface, the plurality of functional units having a function of irradiating the specimen via the objective lens or a detecting function.

* * * * *